(12) United States Patent
Shirata

(10) Patent No.: US 9,773,518 B2
(45) Date of Patent: Sep. 26, 2017

(54) MAGNETIC RECORDING MEDIUM

(71) Applicant: FUJIFILM Corporation, Minato-ku, Tokyo (JP)

(72) Inventor: Masashi Shirata, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/200,329

(22) Filed: Mar. 7, 2014

(65) Prior Publication Data

US 2014/0255728 A1 Sep. 11, 2014

(30) Foreign Application Priority Data

Mar. 7, 2013 (JP) ................................. 2013-045837

(51) Int. Cl.
*G11B 5/708* (2006.01)
*G11B 5/714* (2006.01)
*G11B 5/706* (2006.01)

(52) U.S. Cl.
CPC .......... *G11B 5/714* (2013.01); *G11B 5/70678* (2013.01)

(58) Field of Classification Search
CPC ............................ G11B 5/70678; G11B 5/714
See application file for complete search history.

(56) References Cited

U.S. PATENT DOCUMENTS

2002/0164504 A1* 11/2002 Masaki .................... 428/694 BS
2011/0123830 A1* 5/2011 Tohji et al. ................... 428/800
2012/0251844 A1 10/2012 Yamazaki et al.

FOREIGN PATENT DOCUMENTS

| JP | 05-012664 A | | 1/1993 | |
|---|---|---|---|---|
| JP | 05012664 A | * | 1/1993 | |
| JP | 09102127 A | * | 4/1997 | ............. G11B 5/842 |
| JP | 2003-036521 A | | 2/2003 | |
| JP | 2012-204726 A | | 10/2012 | |

OTHER PUBLICATIONS

Nowosielski et al., Microstructure and magnetic properties of commercial barium ferrite powders, 2006, Journal of Achievements in Materials and Manufacturing Engineering, vol. 20, Issues 1-2, p. 308-310.*
English Machine Translation: Masuda (JP 09102127).*
Machine Translation: Tsuji et al. (JP 05-012664).*
Office Action dated Jan. 27, 2015, issued by the Japanese Patent Office in counterpart Japanese Application No. 2013-045837.

* cited by examiner

*Primary Examiner* — Holly Rickman
*Assistant Examiner* — Linda Chau
(74) *Attorney, Agent, or Firm* — Sughrue Mion, PLLC

(57) ABSTRACT

An aspect of the present invention relates to a magnetic recording medium, which comprises magnetic layer comprising ferromagnetic powder and binder on a nonmagnetic support, wherein the ferromagnetic powder is ferromagnetic hexagonal ferrite powder, the ferromagnetic hexagonal ferrite powder has an activation volume ranging from 800 $nm^3$ to 1,300 $nm^3$, and 1 percent to 50 percent of particles constituting the ferromagnetic hexagonal ferrite powder are ferromagnetic hexagonal ferrite particles, each of which has an indentation with a depth of equal to or more than $\frac{1}{10}$ of an equivalent projected circle diameter of the ferromagnetic hexagonal ferrite particle.

20 Claims, 1 Drawing Sheet

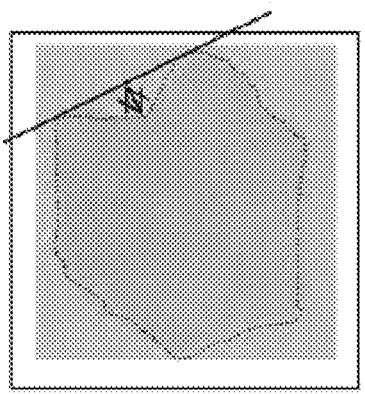

MAGNETIC RECORDING MEDIUM

CROSS-REFERENCE TO RELATED APPLICATIONS

This application claims the benefit of priority under 35 USC 119 to Japanese Patent Application No. 2013-045837 filed on Mar. 7, 2013, which is expressly incorporated herein by reference in its entirety.

BACKGROUND OF THE INVENTION

Field of the Invention

The present invention relates to a magnetic recording medium and to a method of manufacturing the same. More particularly, the present invention relates to a magnetic recording medium capable of possessing both good electromagnetic characteristics and durability, and to a method of manufacturing the same.

Discussion of the Background

Conventionally, primarily ferromagnetic metal powder has come to be employed in the magnetic layers of magnetic recording media for high density recording. Ferromagnetic metal magnetic powder includes acicular particles comprised primarily of iron, and has come to be employed in magnetic recording media for various uses in which a reduction in particle size and high coercive force are sought in high density recording.

With an increase in the quantity of information being recorded has come a constant demand for high-density recording in magnetic recording media. However, in trying to achieve higher density recording, limits to the improvement of ferromagnetic metal magnetic particles have begun to appear.

By contrast, hexagonal ferrite magnetic powder has a coercive force that is high enough for use in permanently magnetic materials, and a magnetic anisotropy, which is the basis of coercive force and is derived from a crystalline structure, that makes it possible to maintain high coercive force even when the size of magnetic particles is reduced. Further, magnetic recording media with magnetic layers in which hexagonal ferrite magnetic powder is employed afford good high-density characteristics due to their vertical component. Such hexagonal ferrite magnetic powder is ferromagnetic material that is suited to higher densities.

In recent years, as recording densities have continued to rise, recording densities of 1 Gbpsi and above, even 10 Gbpsi and above, have been targeted as surface recording densities. To that end, attempts have been made to reduce noise by further reducing the size of microparticles of ferromagnetic hexagonal ferrite powder, thereby enhancing the electromagnetic characteristics (signal/noise ratio (SNR)). In this regard, Japanese Unexamined Patent Publication (KOKAI) No. 2012-204726 or English language family member US2012/251844A1, which are expressly incorporated herein by reference in their entirety, proposes adjusting the composition of hexagonal ferrite to obtain ferromagnetic hexagonal ferrite powder that satisfies the three characteristics known as the magnetic recording trilemma: higher density recording (smaller microparticles in magnetic powder), thermal stability, and ease of writing.

SUMMARY OF THE INVENTION

It is conventionally known that the problem of the magnetic recording trilemma is encountered when the size of the microparticles of ferromagnetic powder is reduced to enhance recording density. However, as a result of investigation conducted by the present inventor, a new problem has become clear, namely, that the greater the reduction in the size of the microparticles of the ferromagnetic hexagonal ferrite powder contained in the magnetic layer, the greater the reduction in the durability of the magnetic recording medium becomes.

An aspect of the present invention provides for a magnetic recording medium having a magnetic layer containing microparticulate ferromagnetic hexagonal ferrite powder and exhibiting good durability.

The present inventor conducted extensive research. As a result, surprisingly, he made the new discovery that when a prescribed quantity of particles having indentations were present among the ferromagnetic hexagonal ferrite powder contained in the magnetic layer, the durability of the magnetic layer could be greatly enhanced, a fact that was previously unknown. Although the reason for this is not entirely clear, the present inventor presumes as follows.

In the manufacturing of a particulate magnetic recording medium, various components such as ferromagnetic powder and binder are admixed and dispersed to prepare a coating material for forming the magnetic layer. Particles having indentations are thought to form due either to portions of the particles dislodging or to the splitting of particles in the dispersion step. When this splitting or dislodging occurs, a new surface on the interior of the particle is exposed as part of the outer surface. The new surface that is exposed as part of the outer surface is of high activity, tending to bond readily with magnetic layer components such as binder and contributing to enhanced film strength in the magnetic layer. The present inventor presumes that as a result, it becomes possible to form a magnetic layer of good durability. Accordingly, it is thought that the decrease in film strength due to the reduction in the size of microparticles in ferromagnetic hexagonal ferrite powder can be compensated for by causing a prescribed quantity of particles having indentations to be present. As will be set forth further below, the present inventor has also newly discovered that it is possible to cause a prescribed quantity of particles having indentations to be present by adopting the means of inhibiting a rise in the liquid temperature in the step of dispersing the coating material for forming the magnetic layer, for example.

The present inventor conducted further research based on the above discoveries and devised the present invention as a result.

An aspect of the present invention relates to:

a magnetic recording medium, which comprises magnetic layer comprising ferromagnetic powder and binder on a nonmagnetic support, wherein the ferromagnetic powder is ferromagnetic hexagonal ferrite powder;

the ferromagnetic hexagonal ferrite powder has an activation volume ranging from 800 $nm^3$ to 1,300 $nm^3$; and 1 percent to 50 percent of particles constituting the ferromagnetic hexagonal ferrite powder are ferromagnetic hexagonal ferrite particles, each of which has an indentation with a depth of equal to or more than $\frac{1}{10}$ of an equivalent projected circle diameter of the ferromagnetic hexagonal ferrite particle.

In an embodiment, the depth of the indentation is equal to or more than $\frac{1}{10}$ and equal to or less than $\frac{1}{4}$ of the equivalent projected circle diameter.

In an embodiment, the indentation has been formed during preparation of a coating material for forming the magnetic layer.

In an embodiment, 5 percent to 45 percent of particles constituting the ferromagnetic hexagonal ferrite powder are ferromagnetic hexagonal ferrite particles, each of which has an indentation with a depth of equal to or more than $\frac{1}{10}$ of an equivalent projected circle diameter of the ferromagnetic hexagonal ferrite particle.

In an embodiment, 10 percent to 40 percent of particles constituting the ferromagnetic hexagonal ferrite powder are ferromagnetic hexagonal ferrite particles, each of which has an indentation with a depth of equal to or more than $\frac{1}{10}$ of an equivalent projected circle diameter of the ferromagnetic hexagonal ferrite particle.

In an embodiment, the activation volume of the ferromagnetic hexagonal ferrite powder ranges from 850 $nm^3$ to 1,250 $nm^3$.

In an embodiment, the activation volume of the ferromagnetic hexagonal ferrite powder ranges from 900 $nm^3$ to 1,200 $nm^3$.

A further aspect of the present invention relates to:

a method of manufacturing the above magnetic recording medium, which comprises:

preparing a coating material forming a magnetic layer comprising ferromagnetic hexagonal ferrite powder and binder;

forming a magnetic layer by coating on a nonmagnetic support the coating material for forming a magnetic layer that has been prepared; and in the preparation of the coating material for forming a magnetic layer, conducting dispersion while inhibiting a rise in temperature of the coating material.

In an embodiment, the dispersion is conducted in the form of sand mill dispersion.

In an embodiment, in the sand mill dispersion, a jacket capable of temperature adjustment is mounted on the exterior of the mill and the temperature within the mill is controlled by means of the jacket.

An aspect of the present invention can provide a magnetic recording medium affording good electromagnetic characteristics in high density recording regions and having good durability.

Other exemplary embodiments and advantages of the present invention may be ascertained by reviewing the present disclosure and the accompanying drawing.

BRIEF DESCRIPTION OF THE DRAWINGS

The present invention will be described in the following text by the exemplary, non-limiting embodiments shown in the FIGURE, wherein:

FIG. 1 is a drawing describing an indentation in a ferromagnetic hexagonal ferrite particle (an example of a particle photograph by a transmission electron microscope).

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

An aspect of the present invention relates to:

a magnetic recording medium, which comprises magnetic layer comprising ferromagnetic powder and binder on a nonmagnetic support, wherein the ferromagnetic powder is ferromagnetic hexagonal ferrite powder;

the ferromagnetic hexagonal ferrite powder has an activation volume ranging from 800 $nm^3$ to 1,300 $nm^3$; and 1 percent to 50 percent of particles constituting the ferromagnetic hexagonal ferrite powder are ferromagnetic hexagonal ferrite particles, each of which has an indentation with a depth of equal to or more than $\frac{1}{10}$ of an equivalent projected circle diameter of the ferromagnetic hexagonal ferrite particle.

The magnetic recording medium according to an aspect of the present invention will be described in greater detail below.

In the magnetic recording medium according to an aspect of the present invention, the ferromagnetic powder contained in the magnetic layer is ferromagnetic hexagonal ferrite powder. Examples of hexagonal ferrite are barium ferrite, strontium ferrite, lead ferrite, calcium ferrite, and various substitution products thereof such as Co substitution products. Specific examples are magnetoplumbite-type barium ferrite and strontium ferrite, magnetoplumbite-type ferrite the particle surfaces of which are coated with spinel, and magnetoplumbite-type barium ferrite and strontium ferrite having a partial spinel phase. In addition to the prescribed atoms, it is also possible to comprise one or more atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb. Generally, powders to which elements such as Co—Zn, Co—Ti, Co—Ti—Zr, Co—Ti—Zn, Ni—Ti—Zn, Nb—Zn—Co, Sb—Zn—Co, and Nb—Zn have been added can be employed. Those comprising specific impurities due to the raw materials or manufacturing method can also be employed.

Examples of methods of manufacturing hexagonal ferrite include: (1) the glass crystallization method of admixing barium oxide, iron oxide, and iron-substitution metal oxides with glass-forming substances such as boron oxide so as to yield a desired ferrite composition; melting and quenching the mixture to obtain an amorphous product; applying another heat treatment; and washing and pulverizing the product to obtain barium ferrite crystalline powder; (2) the hydrothermal reaction method of neutralizing a barium ferrite composition metal salt solution with an alkali; removing the by-products; heating the liquid phase to equal to or higher than 100° C.; and washing, drying, and pulverizing the product to obtain barium ferrite crystalline powder; and (3) the coprecipitation method of neutralizing a barium ferrite composition metal salt solution with an alkali; removing the by-products; drying the product; treating the product at equal to or lower than 1,100° C.; and pulverizing the product to obtain a barium ferrite crystalline powder. The ferromagnetic hexagonal ferrite powder employed in an aspect of the present invention can be manufactured by any method. The glass crystallization method is generally said to be good from the perspectives of yielding a magnetic powder affording microparticle suitability and single particle dispersion suitability that are desirable in magnetic recording media, and a narrow particle size distribution. The glass crystallization method is suitable as the method of manufacturing the ferromagnetic hexagonal ferrite powder employed in an aspect of the present invention. For glass crystallization methods, reference can be made to Japanese Unexamined Patent Publication (KOKAI) No. 2012-204726, paragraph 0013 to 0031; Japanese Unexamined Patent Publication (KOKAI) No. 2012-142529, paragraphs 0012 to 0030; Japanese Unexamined Patent Publication (KOKAI) No. 2011-2135443, paragraphs 0013 to 0035; and Examples of the above publications. The contents of the above publications are expressly incorporated herein by reference in their entirety.

In the magnetic recording medium according to an aspect of the present invention, the ferromagnetic hexagonal ferrite powder that is contained in the magnetic layer has an activation volume falling within a range of 800 $nm^3$ to 1,300 $nm^3$. The term "activation volume" is an indicator of the magnetic particle size, which is the unit of magnetization reversal. The incorporation into the magnetic layer of ferromagnetic hexagonal ferrite powder exhibiting an activation volume of equal to or less than 1,300 $nm^3$ makes it possible to reduce the noise in high-density recording regions and achieve a high SNR. By contrast, when the activation volume exceeds 1,300 $nm^3$, it becomes difficult to reproduce with high sensitivity a signal that has been recorded at high density (the SNR drops). Additionally, in a magnetic recording medium having a magnetic layer containing ferromagnetic hexagonal ferrite powder with an activation volume of less than 800 $nm^3$, the phenomenon of a diminished SNR appears. This is presumed to occur because, due to the small particle size of the ferromagnetic hexagonal ferrite powder, the viscosity of the coating material for forming the magnetic layer is high, and as a result, it becomes difficult to form a magnetic layer with good surface smoothness. Even when particles having indentations are present in a ratio of 1 percent to 50 percent % in a magnetic layer containing ferromagnetic hexagonal ferrite powder with an activation volume of less than 800 $nm^3$, it is difficult to maintain film strength. Accordingly, the activation volume of the ferromagnetic hexagonal ferrite powder is set to 800 $nm^3$ to 1,300 $nm^3$, desirably 850 $nm^3$ to 1,250 $nm^3$, and preferably, to within a range of 900 $nm^3$ to 1,200 $nm^3$. The activation volume can be controlled by the conditions used to manufacture the ferromagnetic hexagonal ferrite powder. For example, in the case of manufacturing by the glass crystallization method, the activation volume of the ferromagnetic hexagonal ferrite powder can be controlled by means of the crystallization conditions.

However, as set forth above, in a magnetic layer containing ferromagnetic hexagonal ferrite powder in the form of microparticles exhibiting the above activation volume, the phenomenon of reduced durability would be seen unless some countermeasure is adopted. By contrast, in an aspect of the present invention, a magnetic layer is provided in which 1 percent to 50 percent of the particles constituting the ferromagnetic hexagonal ferrite powder contained in the magnetic layer are ferromagnetic hexagonal ferrite particles, each of which has an indentation with a depth of equal to or more than $\frac{1}{10}$ of an equivalent projected circle diameter of the ferromagnetic hexagonal ferrite particle. Hereinafter, particles having the above indentation will be referred to as "indented particles" and the proportion of the ferromagnetic hexagonal ferrite powder in the magnetic layer accounted for by indented particles will be referred to as the "indented particle ratio."

The reason for determining that particles having indentations with a depth of equal to or more than $\frac{1}{10}$ of the equivalent projected circle diameter are indented particles is that by having such a depth, the presence of indentations can be clearly determined. Causing particles having such indentations in a proportion of 1 percent to 50 percent to be present in the ferromagnetic hexagonal ferrite powder can enhance the film strength of the magnetic layer containing the ferromagnetic hexagonal ferrite powder exhibiting an activation volume falling within the above-stated range. By contrast, in a magnetic layer containing a larger number of indented particles having an indented particle ratio exceeding 50 percent, the phenomena of a lower SNR and decreased durability were observed. The excessive damaging of ferromagnetic hexagonal ferrite particles in the process of forming numerous indented particles is thought to be a cause of lowered SNR and durability. Additionally, in a magnetic layer in which the indented particle ratio is less than 1 percent, durability is low and it is difficult to achieve a high SNR. The reason why it is difficult to achieve a high SNR is thought to be that running stability decreases due to low film strength. From the perspective of achieving both better electromagnetic characteristics and durability, the indented particle ratio desirably falls within a range of 5 percent to 45 percent, preferably within a range of 10 percent to 40 percent.

The indented particle ratio is obtained by the following method as the ratio of indented particles among 500 ferromagnetic hexagonal ferrite particles randomly extracted from among the ferromagnetic hexagonal ferrite particles in the magnetic layer.

Ferromagnetic hexagonal ferrite particles collected from the magnetic layer are photographed at a magnification of 60,000-fold by a transmission electron microscope (for example, with a model H-9000 transmission electron microscope made by Hitachi). Five hundred particles with equivalent projected circle diameters of equal to or greater than 2 nm are observed in the photograph. The equivalent projected circle diameter is obtained by tracing the outline of each particle with a digitizer and calculating the diameter of a circle with an area identical to that of the traced region (diameter of a circle of equivalent area).

The method of determining the presence or absence of indentations will be described next with reference to FIG. 1.

FIG. 1 is an example of a photograph of particles taken by a transmission electron microscope under the above conditions.

In the photograph, the outline of the various particles are observed. In particles having angular protruding portions in their outlines, a straight line is drawn between adjacent angular portions, as shown in FIG. 1. Any particle in which the greatest distance between any point on this straight line and a point on the contour between the angular portions, as connected by a line passing perpendicularly through the first point, is equal to or more than 1/10 of the diameter of the above equivalent projected circle is determined to be an indented particle. The ratio of particles determined to be indented particles in this manner to 500 particles observed is the indented particle ratio. From the perspective of the magnetic characteristics of the particles, the depth of the indentation of the indented particles is desirably equal to or more than 1/10 and equal to or less than 1/4 of the equivalent projected circle diameter.

Ferromagnetic hexagonal ferrite powder can be collected from the magnetic layer, for example, by the method described in Examples further below. The indented particle ratio can also be measured by drying the coating material for forming the magnetic layer used to prepare the magnetic recording medium and observation by a transmission electron microscope by the method set forth above.

The method of obtaining a magnetic layer containing indented particles in the above ratio will be described further below.

The magnetic recording medium according to an aspect of the present invention will be described in greater detail below.

Magnetic Layer

The magnetic layer comprises ferromagnetic hexagonal ferrite powder and binder. The details of the ferromagnetic hexagonal ferrite powder contained in the magnetic layer are as set forth above. Examples of the binder contained in the magnetic layer are: polyurethane resins; polyester resins; polyamide resins; vinyl chloride resins; styrene; acrylonitrile; methyl methacrylate and other copolymerized acrylic resins; nitrocellulose and other cellulose resins; epoxy resins; phenoxy resins; and polyvinyl acetal, polyvinyl butyral, and other polyvinyl alkyral resins. These may be employed singly or in combinations of two or more. Of these, the desirable binders are the polyurethane resins, acrylic resins, cellulose resins, and vinyl chloride resins. These resins may also be employed as binders in the nonmagnetic layer described further below. Reference can be made to paragraphs 0029 to 0031 in Japanese Unexamined Patent Publication (KOKAI) No. 2010-24113, which is expressly incorporated herein by reference in its entirety, for details of the binder. A polyisocyanate curing agent may also be employed with the above resins.

Additives can be added as needed to the magnetic layer. Examples of these additives are abrasives, lubricants, dispersing agents, dispersion adjuvants, antifungal agents, antistatic agents, oxidation-inhibiting agents, solvents, and carbon black. The additives set forth above may be suitably selected for use based on desired properties in the form of commercial products or those manufactured by the known methods. Reference can also be made to paragraph 0033 in Japanese Unexamined Patent Publication (KOKAI) No. 2010-24113 for details of the carbon black.

Nonmagnetic Layer

Details of the nonmagnetic layer will be described below. The magnetic recording medium according to an aspect of the present invention may comprise a nonmagnetic layer comprising a nonmagnetic powder and a binder between the nonmagnetic support and the magnetic layer. Both organic and inorganic substances may be employed as the nonmagnetic powder in the nonmagnetic layer. Carbon black may also be employed. Examples of inorganic substances are metals, metal oxides, metal carbonates, metal sulfates, metal nitrides, metal carbides, and metal sulfides. These nonmagnetic powders are commercially available and can be manufactured by the known methods. Reference can be made to paragraphs 0036 to 0039 in Japanese Unexamined Patent Publication (KOKAI) No. 2010-24113 for details thereof.

Binders, lubricants, dispersing agents, additives, solvents, dispersion methods, and the like suited to the magnetic layer may be adopted to the nonmagnetic layer. In particular, known techniques for the quantity and type of binder and the quantity and type of additives and dispersing agents employed in the magnetic layer may be adopted thereto. Carbon black and organic powders can be added to the magnetic layer. Reference can be made to paragraphs 0040 to 0042 in Japanese Unexamined Patent Publication (KOKAI) No. 2010-24113 for details thereof.

Nonmagnetic Support

A known film such as biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred. These supports can be corona discharge treated, plasma treated, treated to facilitate adhesion, heat treated, or the like in advance. The center average roughness, Ra, at a cutoff value of 0.25 mm of the nonmagnetic support suitable for use in an aspect of the present invention preferably ranges from 3 to 10 nm.

Layer Structure

As for the thickness structure of the magnetic recording medium according to an aspect of the present invention, the thickness of the nonmagnetic support preferably ranges from 3 µm to 80 µm. The thickness of the magnetic layer can be optimized based on the saturation magnetization of the magnetic head employed, the length of the head gap, and the recording signal band, and is normally 10 nm to 150 nm, preferably 20 nm to 120 nm, and more preferably, 30 nm to 100 nm. At least one magnetic layer is sufficient. The magnetic layer may be divided into two or more layers having different magnetic characteristics, and a known configuration relating to multilayered magnetic layer may be applied.

The nonmagnetic layer is, for example, 0.1 µm to 3.0 µm, preferably 0.3 µm to 2.0 µm, and more preferably, 0.5 µm to 1.5 µm in thickness. The nonmagnetic layer of the magnetic recording medium of the present invention can exhibit its effect so long as it is substantially nonmagnetic. It can exhibit the effect of the present invention, and can be deemed to have substantially the same structure as the magnetic recording medium according to an aspect of the present invention, for example, even when impurities are contained or a small quantity of magnetic material is intentionally incorporated. The term " substantially the same" means that the residual magnetic flux density of the nonmagnetic layer is equal to or lower than 10 mT, or the coercive force is equal to or lower than 7.96 kA/m (equal to or lower than 100 Oe), with desirably no residual magnetic flux density or coercive force being present.

Backcoat Layer

A backcoat layer can be provided on the surface of the nonmagnetic support opposite to the surface on which the magnetic layer are provided, in the magnetic recording medium according to an aspect of the present invention. The backcoat layer desirably comprises carbon black and inorganic powder. The formula of the magnetic layer or nonmagnetic layer can be applied to the binder and various additives for the formation of the back layer. The back layer is preferably equal to or less than 0.9 μm, more preferably 0.1 μm to 0.7 μm, in thickness.

Manufacturing Method

The process for manufacturing magnetic layer, nonmagnetic layer and backcoat layer coating materials normally comprises at least a kneading step, a dispersing step, and a mixing step to be carried out, if necessary, before and/or after the kneading and dispersing steps. Each of the individual steps may be divided into two or more stages. All of the starting materials employed in the present invention, including the ferromagnetic hexagonal ferrite powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of an aspect of the present invention, conventionally known manufacturing techniques may be utilized for some of the steps. A kneader having a strong kneading force, such as an open kneader, continuous kneader, pressure kneader, or extruder is preferably employed in the kneading step. Details of the kneading process are described in Japanese Unexamined Patent Publication (KOKAI) Heisei Nos. 1-106338 and 1-79274. The contents of these applications are incorporated herein by reference in their entirety. Further, glass beads may be employed to disperse the magnetic layer, nonmagnetic layer and backcoat layer coating materials. Dispersing media with a high specific gravity such as zirconia beads, titania beads, and steel beads are also suitable for use. The particle diameter and filling rate of these dispersing media can be optimized for use. A known dispersing device may be employed. Reference can be made to paragraphs 0051 to 0057 in Japanese Unexamined Patent Publication (KOKAI) No. 2010-24113 for details of the method of manufacturing a magnetic recording medium.

As set forth above, a coating material (coating liquid) for forming the magnetic layer can be prepared by conducting a dispersion step. The dispersion step can be conducted with a mill dispersion apparatus such as a sand mill or a bead mill. The temperature of the liquid in the dispersion normally rises due to friction and the like between particles. In this regard, the present inventor made a new discovery, previously unknown, that the higher the temperature of the liquid during dispersion, the greater the drop in the indented particle ratio, and the lower the temperature of the liquid, the greater the increase in the indented particle ratio. Accordingly, it is conceivable that the indentations in the indented particles are formed in the dispersion step during preparation of the coating material for forming the magnetic layer. As set forth above, since the indented particle ratio may change with the temperature of the liquid during dispersion, it is possible to form a magnetic layer containing indented particles of desired ratio by controlling the temperature of the liquid during the dispersing step. The temperature of the liquid is desirably controlled by inhibiting a rise in temperature within the dispersing apparatus. For example, in sand mill dispersion, a jacket capable of temperature adjustment can be mounted on the exterior of the mill and the temperature within the mill can be controlled by means of the jacket. The temperature within the dispersing apparatus is desirably controlled to about 10° C. to 30° C., for example. The remaining dispersion conditions can be suitably set based on the composition, manufacturing method, and the like of the hexagonal ferrite. For example, a dispersion period of about 60 minutes to 180 minutes can be adopted. However, since it can be suitably set based on the composition and manufacturing method of the hexagonal ferrite as set forth above, this range is not a limitation.

In the magnetic recording medium according to an aspect of the present invention as set forth above, 1 percent to 50 percent of indented particles are contained in the ferromagnetic hexagonal ferrite powder of the magnetic layer. This makes it possible to achieve both high durability and a high SNR in regions of high recording density. The magnetic recording medium according to an aspect of the present invention is thus suitable as a magnetic recording medium for high density recording, such as a backup tape, which is required to afford good electromagnetic characteristics and permit use for extended period with high reliability.

A further aspect of the present invention relates to a method of manufacturing the magnetic recording medium according to an aspect of the present invention. The method of manufacturing the magnetic recording medium according to an aspect of the present invention comprises preparing a coating material for forming a magnetic layer comprising ferromagnetic hexagonal ferrite powder and binder; forming a magnetic layer by coating on a nonmagnetic support the coating material for forming a magnetic layer that has been prepared; and in the preparation of the coating material for forming a magnetic layer, conducting dispersion while inhibiting a rise in the liquid temperature. The dispersion can be conducted by sand mill dispersion, for example. As set forth above, in sand mill dispersion, a jacket capable of temperature adjustment can be mounted on the exterior of the mill and the temperature within the mill can be controlled by means of the jacket to control the indented particle ratio. Additional details regarding the method of manufacturing the magnetic recording medium according to an aspect of the present invention are as set forth above.

EXAMPLES

The present invention will be described in detail below based on Examples. However, the present invention is not limited to Examples. The term "parts" given in Examples is weight parts unless specifically stated otherwise.

1. Preparing Ferromagnetic Hexagonal Ferrite Powder by the Glass Crystallization Method A 1,481 g quantity of $BaCO_3$, 666 g of $H_3BO_3$, 1,115 g of $Fe_2O_3$, 74.2 g of $Al(OH)_3$, and 17.6 g of $Nb_2O_5$ were weighed out and mixed in a mixer to obtain a starting material mixture.

The starting material mixture thus obtained was melted in a platinum crucible of one-liter capacity. While stirring at 1,380° C., a tap hole positioned in the bottom of the platinum crucible was heated and the melt was discharged in rod form at about 6 g/s. The discharge liquid was quenched and rolled with a pair of water-cooled rolls to fabricate an amorphous material.

A 280 g quantity of the amorphous material thus obtained was charged to an electric furnace, the temperature indicated in Table 1 (crystallization temperature) was maintained for five hours, and ferromagnetic hexagonal barium ferrite particles were precipitated (crystallized).

The crystalline material containing the ferromagnetic hexagonal barium ferrite particles was coarsely pulverized in a mortar, 1,000 g of 1 mm φ zirconia beads and 800 mL of a 1 percent concentration of acetic acid were added to a 2,000 mL glass flask, and dispersion was conducted for three hours in a paint shaker. Subsequently, the dispersion was separated from the beads and charged to a three-liter stainless steel beaker. The dispersion was processed for three hours at 100° C., repeatedly washed by precipitation in a centrifuge and decantation, and dried to obtain particles. The particles obtained were confirmed to be hexagonal ferrite (barium ferrite) by X-ray diffraction analysis.

2. Preparing a Magnetic Recording Medium (Magnetic Tape)

<Magnetic Layer Coating Material>
Ferromagnetic hexagonal barium ferrite particles prepared in 1. above: 100 parts
Polyurethane resin: 12 parts
  Weight average molecular weight: 10,000
  Sulfonic acid functional group content: 0.5 meq/g
Diamond microparticles (average particle diameter: 50 nm): 2 parts
Carbon black (#55, particle size: 0.015 μm, made by Asahi Carbon): 0.5 part
Stearic acid: 0.5 part
Butyl stearate: 2 parts
Methyl ethyl ketone: 180 parts
Cyclohexanone: 100 parts
<Nonmagnetic Layer Coating Material>
Nonmagnetic powder α-iron oxide: 100 parts
  Average primary particle diameter: 0.09 μm
  Specific surface area by BET method: 50 m$^2$/g
  pH: 7
  DBP oil absorption capacity: 27 to 38 g/100 g
  Surface treatment agent $Al_2O_3$: 8 weight percent
Carbon black (Conductex SC-U, made by Colombian Carbon): 25 parts
Vinyl chloride copolymer (MR104, made by Zeon Corp.): 13 parts
Polyurethane resin (UR 8200, made by Toyobo): 5 parts
Phenylphosphonic acid: 3.5 parts
Butyl stearate: 1 part
Stearic acid: 2 parts
Methyl ethyl ketone: 205 parts
Cyclohexanone: 135 parts For each of the above coating materials, the various components were kneaded in a kneader. The liquid was pumped into a horizontal sand mill containing a quantity of 1.0 mm φ zirconia beads filling 65 percent of the volume of the dispersion part and dispersed for 120 minutes (substantial retention time in dispersion part) at 2,000 rpm. During dispersion of the coating material for forming a magnetic layer, an external jacket capable of temperature adjustment was mounted on the horizontal sand mill and used to control the temperature within the sand mill to the temperature shown in Table 1.

In the case of the coating material for the nonmagnetic layer, 6.5 parts of polyisocyanate were added to the dispersion obtained. Subsequently, 7 parts of methyl ethyl ketone were added, the liquids were filtered through filters having an average pore diameter of 1 μm, and coating materials for forming the nonmagnetic layer and magnetic layer were obtained.

The nonmagnetic layer coating material obtained was coated and dried to a thickness of 1.0 μm on a polyethylene naphthalate base 5 μm in thickness, after which successive multilayer coating was conducted to form a magnetic layer 70 nm in thickness. After drying, the product was processed with a seven-stage calender at a temperature of 90° C. and a linear pressure of 300 kg/cm. It was then slit to ¼ inch width and subjected to a surface polishing treatment to obtain a magnetic tape.

3. Evaluation Methods

The magnetic tape was evaluated by the following methods. Each evaluation was conducted in an environment of 23° C.+1° C., unless specifically stated otherwise. The results are given in Table 1.

(1) SNR

The reproduction output, noise, and SNR of each magnetic tape was measured after mounting a recording head (MIG, gap 0.15 μm, 1.8 T) and a reproduction GMR tape on a drum tester and recording a signal at a linear recording density of 400 Kbpi (surface recording density 6.4 Gbpsi).

(2) Calculation of Activation Volume

Measurement was conducted with a vibrating sample magnetometer (made by Toei Industry Co., Ltd.) at magnetic sweep rates of 3 minutes and 30 minutes in the Hc measuring element, and the activation volume V was calculated from the following equation relating Hc due to thermal fluctuation and magnetization reversal volume.

$$Hc=(2Ku/Ms)*\{1-[(kT/KuV)ln(At/0.693)]^{(1/2)}\}$$

[In the equation, Ku: anisotropy constant; Ms: saturation magnetization; k: Boltzmann constant; T: absolute temperature; V: activation volume; A: spin precession frequency; t: magnetic reversal time]

(3) Coating Strength (Scratch Resistance (Alumina Abrasion) Evaluation Method)

In an environment of 23° C. and 10% RH, a load of 20 g was applied to the tape surface, and the tape surface was run back and forth 20 times over alumina balls 4 mm in diameter. Subsequently, the surface of the tape sample was observed by an optical microscope (magnification: 200-fold) and evaluated on the following scale:

A: No scratches visible on the sample surface within the field of view of the optical microscope.

B: Scratches visible in 1 to 5 spots on the sample surface within the field of view of the optical microscope.

C: Scratches visible in 6 to 10 spots on the sample surface within the field of view of the optical microscope.

D: Scratches visible in 11 to 50 spots on the sample surface within the field of view of the optical microscope.

E: Scratches visible in more than 50 spots on the sample surface within the field of view of the optical microscope.

(4) Calculating the Indented Particle Ratio

A suitable quantity of the magnetic layer was peeled off. To 30 mg to 70 mg of the magnetic layer that had been peeled off was added n-butyl amine. The mixture was sealed in a glass tube, the glass tube was set in a thermal decomposition device, and heating was conducted at 140° C. for about one day.

Subsequently, the contents of the glass tube were cooled, removed, and centrifuged to separate the liquid and solid components. The solid component that separated out was washed with acetone to obtain a powder sample for measurement by a transmission electron microscope. Using a model H-9000 transmission electron microscope made by Hitachi, the indented particle ratio of the powder sample was calculated by the method set forth above. The depth of the indentations in the indented particles observed was equal to or more than 1/10 and equal to or less than ¼ of the equivalent projected circle diameter of each particle.

TABLE 1

|  | Crystallization temperature | Sand mill temperature | Sand mill time | Activation volume | Indented particle ratio | SNR | Scratch resistance |
|---|---|---|---|---|---|---|---|
| Comp. Ex. 1 | 630° C. | 40° C. | 120 minutes | 1260 nm$^3$ | 0.3% | +1.0 dB | E |
| Comp. Ex. 2 | 650° C. | 40° C. | 120 minutes | 1380 nm$^3$ | 20% | 0.0 dB | B |
| Ex. 1 | 630° C. | 15° C. | 120 minutes | 1260 nm$^3$ | 31% | +1.5 dB | A |
| Comp. Ex. 3 | 650° C. | 15° C. | 120 minutes | 1380 nm$^3$ | 49% | −0.1 dB | B |
| Comp. Ex. 4 | 550° C. | 15° C. | 120 minutes | 760 nm$^3$ | 12% | −2.5 dB | E |
| Ex. 2 | 625° C. | 15° C. | 120 minutes | 1240 nm$^3$ | 28% | +1.4 dB | A |
| Ex. 3 | 590° C. | 15° C. | 120 minutes | 1050 nm$^3$ | 25% | +1.8 dB | A |
| Ex. 4 | 560° C. | 15° C. | 120 minutes | 810 nm$^3$ | 14% | +1.0 dB | B |
| Ex. 5 | 605° C. | 15° C. | 120 minutes | 1180 nm$^3$ | 26% | +1.7 dB | A |
| Ex. 6 | 570° C. | 15° C. | 120 minutes | 880 nm$^3$ | 12% | +1.5 dB | B |
| Ex. 7 | 630° C. | 25° C. | 120 minutes | 1260 nm$^3$ | 8% | +1.3 dB | B |
| Ex. 8 | 630° C. | 10° C. | 120 minutes | 1260 nm$^3$ | 42% | +1.5 dB | A |
| Ex. 9 | 630° C. | 10° C. | 180 minutes | 1260 nm$^3$ | 48% | +1.3 dB | C |
| Ex. 10 | 630° C. | 25° C. | 60 minutes | 1260 nm$^3$ | 2% | +1.9 dB | C |
| Comp. Ex. 5 | 630° C. | 5° C. | 120 minutes | 1260 nm$^3$ | 55% | +0.1 dB | D |

Evaluation Results

As shown in Table 1, Comparative Example 1 exhibited poor scratch resistance due to a low indented particle ratio.

The reason for the low SNR in Comparative Examples 2 and 3 was a large activation volume that increased noise.

Comparative Example 4, which had an excessively low activation volume, and Comparative Example 5, which had an excessively high indented particle ratio, both exhibited poor SNRs and scratch resistance.

By contrast, Examples 1 to 10 exhibited good SNRs and scratch resistance.

Based on the above results, an aspect of the present invention could be determined to provide a magnetic recording medium having both good electromagnetic characteristics and durability.

An aspect of the present invention is useful in the field of the manufacturing of magnetic recording media for high density recording, such as backup tapes.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic recording medium, which comprises a magnetic layer comprising ferromagnetic powder and a binder on a nonmagnetic support, wherein
   the ferromagnetic powder is ferromagnetic hexagonal barium ferrite powder;
   the ferromagnetic hexagonal barium ferrite powder has an activation volume ranging from 800 nm$^3$ to 1,300 nm$^3$; and
   a prescribed quantity of from 2 percent to 48 percent of particles constituting the ferromagnetic hexagonal barium ferrite powder are ferromagnetic hexagonal barium ferrite particles, each of which has an indentation with a depth of equal to or more than ¹⁄₁₀ of an equivalent projected circle diameter of the ferromagnetic hexagonal barium ferrite particle.

2. The magnetic recording medium according to claim 1, wherein the depth of the indentation is equal to or more than ¹⁄₁₀ and equal to or less than ¼ of the equivalent projected circle diameter.

3. The magnetic recording medium according to claim 1, wherein the indentation has been formed during preparation of a coating material for forming the magnetic layer.

4. The magnetic recording medium according to claim 1, wherein 5 percent to 45 percent of particles constituting the ferromagnetic hexagonal barium ferrite powder are ferromagnetic hexagonal barium ferrite particles, each of which has an indentation with a depth of equal to or more than ¹⁄₁₀ of an equivalent projected circle diameter of the ferromagnetic hexagonal barium ferrite particle.

5. The magnetic recording medium according to claim 4, wherein 10 percent to 40 percent of particles constituting the ferromagnetic hexagonal barium ferrite powder are ferromagnetic hexagonal barium ferrite particles, each of which has an indentation with a depth of equal to or more than ¹⁄₁₀ of an equivalent projected circle diameter of the ferromagnetic hexagonal barium ferrite particle.

6. The magnetic recording medium according to claim 2, wherein 5 percent to 45 percent of particles constituting the ferromagnetic hexagonal barium ferrite powder are ferromagnetic hexagonal barium ferrite particles, each of which has an indentation with a depth of equal to or more than ¹⁄₁₀ of an equivalent projected circle diameter of the ferromagnetic hexagonal barium ferrite particle.

7. The magnetic recording medium according to claim 6, wherein 10 percent to 40 percent of particles constituting the ferromagnetic hexagonal barium ferrite powder are ferromagnetic hexagonal barium ferrite particles, each of which has an indentation with a depth of equal to or more than ¹⁄₁₀ of an equivalent projected circle diameter of the ferromagnetic hexagonal barium ferrite particle.

8. The magnetic recording medium according to claim 1, wherein the activation volume of the ferromagnetic hexagonal barium ferrite powder ranges from 850 $nm^3$ to 1,250 $nm^3$.

9. The magnetic recording medium according to claim 8, wherein the activation volume of the ferromagnetic hexagonal barium ferrite powder ranges from 900 $nm^3$ to 1,200 $nm^3$.

10. The magnetic recording medium according to claim 2, wherein the activation volume of the ferromagnetic hexagonal barium ferrite powder ranges from 850 $nm^3$ to 1,250 $nm^3$.

11. The magnetic recording medium according to claim 10, wherein the activation volume of the ferromagnetic hexagonal barium ferrite powder ranges from 900 $nm^3$ to 1,200 $nm^3$.

12. The magnetic recording medium according to claim 4, wherein the activation volume of the ferromagnetic hexagonal barium ferrite powder ranges from 850 $nm^3$ to 1,250 $nm^3$.

13. The magnetic recording medium according to claim 12, wherein the activation volume of the ferromagnetic hexagonal barium ferrite powder ranges from 900 $nm^3$ to 1,200 $nm^3$.

14. The magnetic recording medium according to claim 5, wherein the activation volume of the ferromagnetic hexagonal barium ferrite powder ranges from 850 $nm^3$ to 1,250 $nm^3$.

15. The magnetic recording medium according to claim 14, wherein the activation volume of the ferromagnetic hexagonal barium ferrite powder ranges from 900 $nm^3$ to 1,200 $nm^3$.

16. The magnetic recording medium according to claim 6, wherein the activation volume of the ferromagnetic hexagonal barium ferrite powder ranges from 850 $nm^3$ to 1,250 $nm^3$.

17. The magnetic recording medium according to claim 16, wherein the activation volume of the ferromagnetic hexagonal barium ferrite powder ranges from 900 $nm^3$ to 1,200 $nm^3$.

18. The magnetic recording medium according to claim 7, wherein the activation volume of the ferromagnetic hexagonal barium ferrite powder ranges from 850 $nm^3$ to 1,250 $nm^3$.

19. The magnetic recording medium according to claim 18, wherein the activation volume of the ferromagnetic hexagonal barium ferrite powder ranges from 900 $nm^3$ to 1,200 $nm^3$.

20. The magnetic recording medium according to claim 1, wherein the ferromagnetic hexagonal barium ferrite powder has an activation volume ranging from 810 $nm^3$ to 1260 $nm^3$.

* * * * *